(12) United States Patent
Yoshizawa et al.

(10) Patent No.: US 6,795,185 B2
(45) Date of Patent: Sep. 21, 2004

(54) FILM THICKNESS MEASURING APPARATUS

(75) Inventors: Tomoya Yoshizawa, Utsumomiya (JP); Kunio Otsuki, Kyoto (JP)

(73) Assignee: Horiba, Ltd., Kyoto (JP)

( * ) Notice: Subject to any disclaimer, the term of this patent is extended or adjusted under 35 U.S.C. 154(b) by 228 days.

(21) Appl. No.: 10/094,383

(22) Filed: Mar. 8, 2002

(65) Prior Publication Data

US 2002/0154319 A1 Oct. 24, 2002

(30) Foreign Application Priority Data

Mar. 9, 2001 (JP) ........................................ 2001-067320

(51) Int. Cl.[7] .................................................. G01J 4/00

(52) U.S. Cl. .................................... 356/369; 356/239.2

(58) Field of Search ................................. 356/369, 370, 356/630, 239.7, 237.2; 250/225, 228

(56) References Cited

U.S. PATENT DOCUMENTS

| | | | | |
|---|---|---|---|---|
| 5,485,271 A | * | 1/1996 | Drevillon et al. | 356/491 |
| 5,486,701 A | | 1/1996 | Norton et al. | |
| 5,517,312 A | * | 5/1996 | Finarov | 356/630 |
| 5,757,671 A | * | 5/1998 | Drevillon et al. | 356/367 |
| 5,956,148 A | * | 9/1999 | Celii | 356/369 |
| 6,134,012 A | * | 10/2000 | Aspnes et al. | 356/369 |
| 6,181,427 B1 | * | 1/2001 | Yarussi et al. | 356/445 |
| 6,278,519 B1 | * | 8/2001 | Rosencwaig et al. | 356/369 |
| 6,611,330 B2 | * | 8/2003 | Lee et al. | 356/369 |
| 6,618,154 B2 | * | 9/2003 | Engel et al. | 356/503 |

* cited by examiner

Primary Examiner—Frank G. Font

(57) ABSTRACT

A film thickness measuring apparatus capable of restricting a measurement area on the surface of a sample is provided. An incident optical system provides an irradiating polarized light to the surface of the sample. A detecting optical system receives the reflected light having an elliptical polarization and provides a reduced aperture that can restrict the light provided through a fiber optic conduit to a spectrometer and thereby eliminate aberrations and noise problems.

34 Claims, 2 Drawing Sheets

FILM THICKNESS MEASURING APPARATUS

BACKGROUND OF THE INVENTION

1. Field of the Invention

The present invention relates to a film thickness measuring apparatus for measuring the thickness of a thin film on a sample, such as the surfaces of a semiconductor wafer, reticle/mask and a glass substrate of a liquid crystal display (LCD), and more particularly, to an apparatus to enable the measurement of optical characteristics and film thickness of a relatively small surface area, while minimizing chromatic aberrations.

2. Description of Related Art

Film thickness measuring apparatuses have been utilized, such as a spectroscopic ellipsometer that can measure a polarization state change when light reflects from the surface of a substance. By analyzing the detected reflected light, it is possible to measure certain optical constants, such as refractive index and extinction coefficients of the substance. Additionally, when a thin film layer exists on the surface of the substance or sample, it is possible to measure the film thickness and the optical constants.

As semiconductor elements and optical members have become increasingly small, problems have occurred in attempting to measure a film thickness of such a sample, for example, a semiconductor wafer that has a very restricted area. As the field of view or target area of the sample is reduced in size, the diameter of the incident light beam has been frequently reduced correspondingly. An incident optical system used in such a spectroscopic ellipsometer has included a slit provided between a light source and a polarizer, with the size of the aperture of the slit being selected to reduce the diameter of the incident beam upon the sample to be as small as possible.

However, when a light of multiple wavelengths is used as the irradiating light, chromatic aberrations can arise when using a lens for a beam reducing optical system, or using a polarizer as a polarizing element. Thus, it becomes difficult to reduce the incident beam to an extremely small diameter in contrast to the situations where a single wavelength beam is used in other measuring instruments. When the wavelength of the irradiating light ranges from a short wavelength of 190 nm to a long wavelength of 830 nm, it has been found that the reduction of the incident beam diameter can cause considerable difficulty. Incidentally, the foregoing chromatic abberation results from the difference of the refractive index depending upon the wavelengths, i.e., aberrations (defect produced when an image optical system does not satisfy the condition of Gaussian imaging) caused by the dispersion of rays of light.

Even when the incident beam diameter is reduced, there is still a disadvantage in that a secondary light can be developed around the incident light and that this developed light is also added to the measured light in the optical system.

Thus, there is still a desire to improve the ability to measure a film thickness of relatively small restricted areas while avoiding the problems of the prior art.

SUMMARY OF THE INVENTION

The present invention provides a film thickness measuring apparatus comprising a source of light with an incident optical system capable of polarizing and focusing the light on a sample location. The incident optical system can comprise a pair of concave reflective surfaces to assist in focusing the light along with a polarizer unit. A member having a slit aperture can also be used to define the incident polarized light beam. A detector optical system can focus the reflected polarizing light for analysis by a spectroscope. The detector optical system can include a phase modulation element and an analyzer element, along with a pair of reflective concave surfaces for focusing the light onto a restricted aperture that defines a relatively small field of view on the sample location. A rotatable member that can be driven, for example, by a stepper motor can selectively position one of a plurality of restricted apertures of respectively different sizes to meet the requirements of the particular sample surface under inspection. A fiber optic can be operatively positioned to align with the selected restricted aperture for providing an input of the focused reflected light to the spectroscope.

Additionally, a microscope and a CCD camera can provide an image of the sample surface for display. A computer unit can process not only the output from the spectroscope to provide the various optical constants, such as a refractive index and extinction coefficient and also the film thickness, but also can further process the image signals from the CCD camera to provide a combined display image to the operator.

BRIEF DESCRIPTION OF THE DRAWINGS

The exact nature of this invention, as well as its objects and advantages, will become readily apparent from consideration of the following specification as illustrated in the accompanying drawings, in which like reference numerals designate like parts throughout the figures thereof, and wherein.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art of film thickness measuring apparatus.

Figure 1:
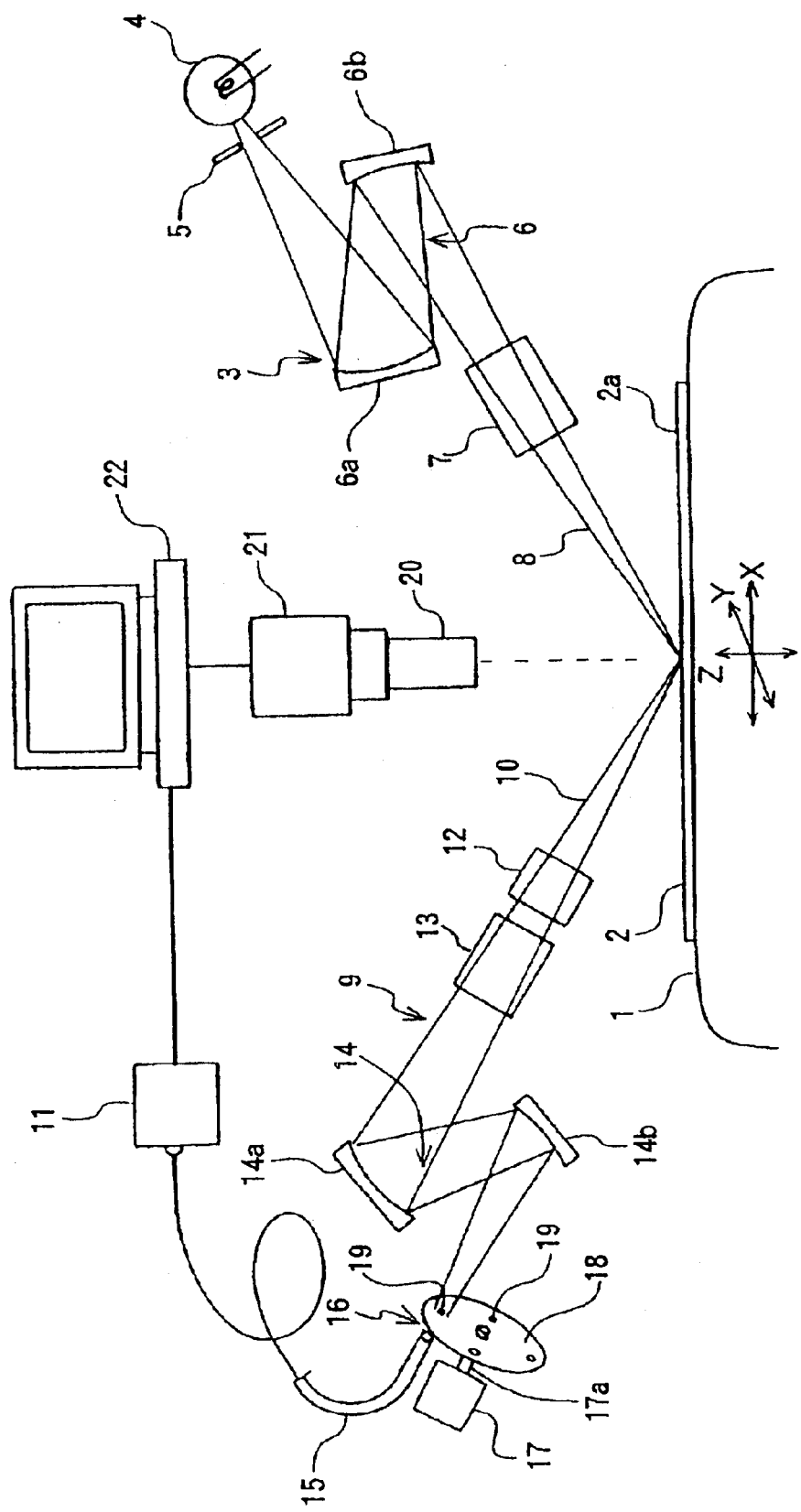
FIG. 1 is a schematic view of a film thickness measuring apparatus of the present invention.
Figure 2:
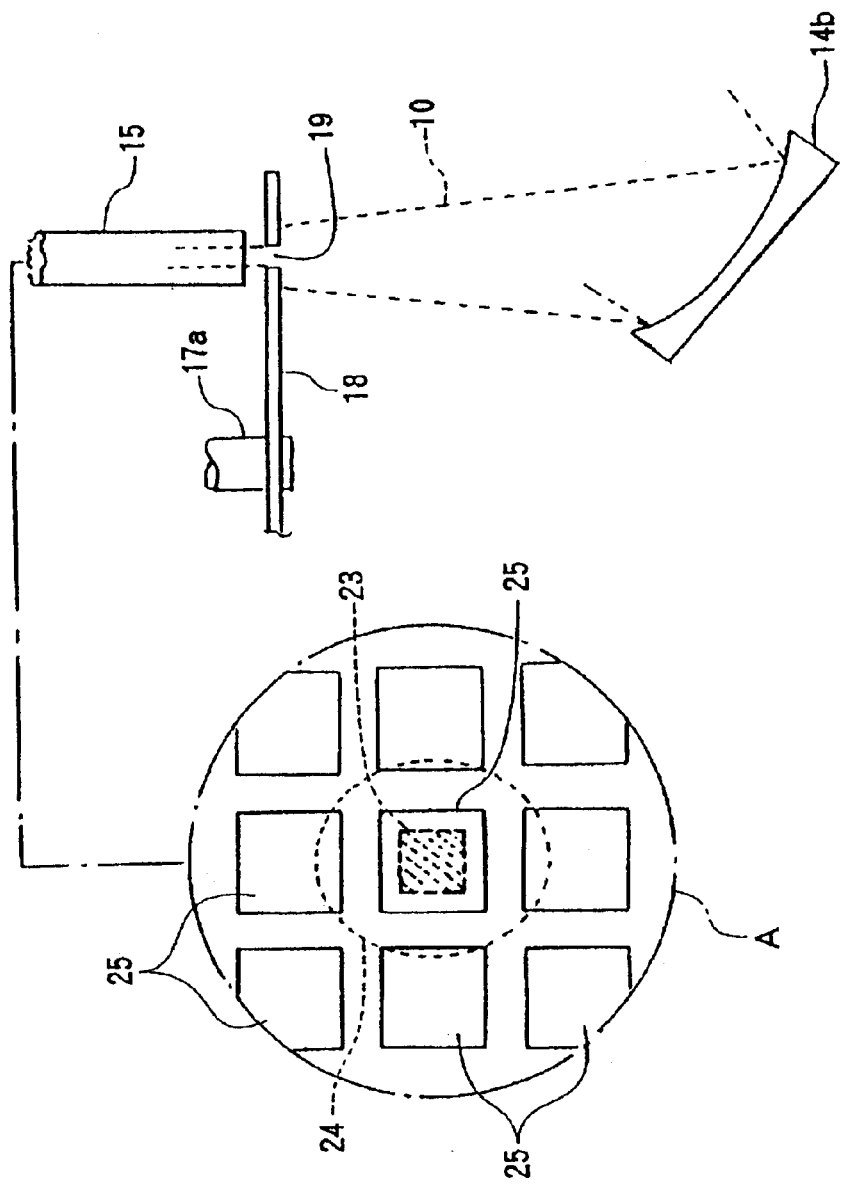
FIG. 2 is a schematic view disclosing the relationship of the focused reflected polarized light and it's relationship to the restricted aperture and fiber optic conduit.

Referring to FIGS. 1 and 2, an explanation of the present invention is provided. As can be appreciated by a person skilled in this field, various elements and their operations are known by persons of skill in this field, and accordingly, a detailed explanation of the manner in which a polarizer, phase modulator and analyzer function will be omitted.

As shown in FIG. 1, a schematic view of a spectroscopic ellipsometer of the present invention acting as a film thickness measuring apparatus is disclosed. A measuring stage, or test sample location 1, can be constructed in such a manner that a wafer 2 positioned as a sample is held on the measuring stage 1, for example, by the provision of vacuum between the measuring stage 1 and the bottom surface of the wafer substrate. Accordingly, the sample will be firmly held at a horizontal position and can be moved linearly in three directions, including the X direction, or horizontal direction to the present drawing of FIG. 1, a Y direction, or perpendicular direction to the drawing, and a Z direction, or vertical direction to the drawing by a conventional structure not disclosed in FIG. 1.

A white light source 4, which can comprise a lamp, such as a xenon lamp, emitting light having a relatively wide wavelength range, for example, from 190 nm to 830 nm, can be utilized. A beam limiting slit unit 5 having an aperture to reduce the light emitted from the white light source 4 is positioned adjacent to the white light source 4 and before an incident optical system 3. The incident optical system 3 provides a beam reducing function that can comprise two concave reflective surfaces or mirrors 6a and 6b, which focus and direct a light through a polarizer unit 7 so that a linearly polarized light 8 can irradiate the surface 2a of the sample 2. Thus, the multi-wavelength light from the light source 4 is initially reduced in diameter and polarized in a predetermined direction before application to the surface of the sample 2. The light reflected from the sample surface 2a will experience a change in state of polarization of an elliptically polarized light, so that the initial linearly polarized light 8 reflected as an elliptically polarized light 10 to enter a detector optical system 9 on the opposite side of the sample stage 1 from the incident optical system 3. The detector optical system 9 includes a phase modulation element 12, an analyzer unit 13, and a pair of reflective concave surfaces or mirrors 14a and 14b. The mirrors 14a and 14b provide a beam reducing optical system for focusing the elliptically polarized light 10 for entrance into an optical fiber conduit 15. The optical fiber conduit 15 transmits the light information to the spectrometer 11. A rotatable pinhole member 16 has at least one reduced aperture for defining a target area or field of view along the optical axis of the detector optical system. The rotatable member 16 can have a plurality of reduced apertures or pinholes 19 of various sizes or diameters spaced at appropriate distances on an identical circumference of a circle of the disk 18. The disk 18 can have an axis of revolution 17a and is connected to a stepping motor 17 which can be automatically driven to select an appropriate pinhole 19 or reduced aperture along the optical path passing through the beam-reducing optical system 14 and the optical fiber 15. The diameters of the pinhole reduced apertures can typically range in size from 30 μm to 1 mm.

An optical microscope 20 is positioned above the sample stage 1 and can be connected with a camera, such as a CCD camera 21 to provide an image of the measurement surface.

A computer unit 22 can process the measurements from the spectroscope 11, that is, the measurements of the amount of change in polarization of light 10 resulting from it's reflection on the surface 2a of the wafer, and also the image signals from the optical microscope 20 and the CCD camera 21. These measurements can be appropriately processed, or subject to image processing, to measure both the optical constants, such as refractive index, and extinction coefficient of the wafer surface 2a and also the film thickness of a thin film on the sample surface 8a.

By utilizing the arrangement disclosed, for example in FIG. 1, a film thickness measuring apparatus can utilize an aperture slit unit 5 of a relatively large size by using a restriction on the measurement light with a pin hole aperture on the rotatable member 16 located between the optical fiber 15, and the detector optical system 14. The problems associated with trying to reduce a multi-color light source emitted from the light source 4 to a size sufficiently small to be used for measurement surfaces required by today's industry, such as problems in aberrations and noise, can be eliminated, or substantially reduced.

Referring to FIG. 2, the image surface is disclosed in an area A of FIG. 2. The receptive light that is being reflected from the sample surface 2A in the beam area 24 is unnecessary, other than the hatched portion 23, and this field of view can be provided by the reduced aperture pin hole 19. As a result, it is possible to obtain an effect equivalent to the case where the incident beam would be reduced on the side of the slit unit 5, while eliminating the problems inherent in chromatic aberrations and the adjacent surrounding incident light that can affect the readings. Thus, it is possible to only operate on the desired reflective sample light when measurements are taken by the spectrometer 11.

It is also possible to visually confirm the desired view area 23 by removing the optical fiber 15 and irradiating light on the target area from behind the pin hole section 16 to project the image 23 of the pin hole on the wafer 2.

Additionally, since a plurality of pin hole apertures 19 of varying sizes can be provided in the pin hole section, it is possible to subjectively select the sampling area of the wafer 2 by matching a predetermined size with an appropriate pin hole aperture.

While the pin hole section 16 is disclosed immediately adjacent to the fiber optic, it is possible that it could also be positioned at other locations between the analyzer 13 and the spectrometer 11.

As a result of the construction of the present invention, it is possible to significantly restrict a sampling area to be measured on the surface of the sample without requiring a reduction in the incident beam diameter with it's corresponding problems. It is also possible to take in only the sampling light from the desired area of the sample without being corrupted by surrounding incident light or problems associated with chromatic aberrations.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A film thickness measuring apparatus comprising:
   a source of light;
   an incident optical system for polarizing and directing light to a sample, the directed light being reduced to a beam diameter sufficient to irradiate the sample;
   a detector optical system for receiving light from the sample, including a restricted aperture for defining a field of view on the sample smaller than the incident beam diameter on the sample; and
   a sensor unit for providing an output representative of the light from the sample.

2. The film thickness measuring apparatus of claim 1, wherein the detector optical system includes a plurality of restricted apertures of different sizes that are selectively inserted within an optical axis that extends through the detector optical system to provide respective different fields of view.

3. The film thickness measuring apparatus of claim 2, wherein the plurality of restricted apertures are provided in a rotatable member to sequentially align a restricted aperture on the optical axis.

4. The film thickness measuring apparatus of claim 3, further including a stepper motor for driving the rotatable member.

5. The film thickness measuring apparatus of claim 3, further including a fiber optic conduit operatively positioned between the rotatable member and the sensor unit.

6. The film thickness measuring apparatus of claim 1, wherein the detector optical system further includes a phase modulation member and an analyzer member.

7. The film thickness measuring apparatus of claim 6, wherein the detector optical system further includes a pair of concave reflective surfaces for focusing the light from the sample on the restricted aperture.

8. The film thickness measuring apparatus of claim 7, wherein the incident optical system further includes a pair of concave reflective surfaces for focusing the light from the light source on the sample.

9. The film thickness measuring apparatus of claim 8, wherein the incident optical system further includes a polarizer unit and a slit aperture member.

10. The film thickness measuring apparatus of claim 9, wherein the sensor unit is a spectrometer.

11. The film thickness measuring apparatus of claim 10, further including a microscope and a camera unit for providing an image of the sample.

12. The film thickness measuring apparatus of claim 11, further including a computer unit for processing the output of the sensor unit to measure optical constants of the surface and processing an output of the camera unit for providing an image for display with the optical constants.

13. A film thickness measuring apparatus comprising:
a source of multi-wavelength light;
an incident optical system for polarizing and directing the light to a sample;
a detector optical system for receiving light from the sample, including a plurality of restricted apertures, each capable of defining a field of view of a different size on the sample; and
a spectrometer for providing an output representative of the light from the sample through one of the plurality of restricted appertures.

14. The film thickness measuring apparatus of claim 13, wherein the plurality of restricted apertures are provided in a rotatable member to sequentially align a restricted aperture on the optical axis.

15. The film thickness measuring apparatus of claim 14, further including a stepper motor for driving the rotatable member.

16. The film thickness measuring apparatus of claim 15, further including a fiber optic conduit operatively positioned between the rotatable member and the spectrometer.

17. The film thickness measuring apparatus of claim 16, further including a microscope and a camera unit for providing an image of the sample.

18. The film thickness measuring apparatus of claim 17, further including a computer unit for processing the output of the spectroscope to measure optical constants of the surface and processing an output of the camera unit for providing an image for display with the optical constants.

19. A film thickness measuring apparatus comprising:
a source of multi-wavelength light;
an incident optical system for polarizing and directing an incident light beam to a sample in a first state of polarization that can be changed to a second state of polarization by reflection from the sample, the directed incident light being reduced to a beam diameter sufficient to irradiate the sample;
a detector optical system for receiving light reflected from the sample, including an analyzer member and a pinhole aperture member for defining a reduced diameter of the reflected light beam smaller than the incident light beam diameter on the sample; and
a spectrometer for providing an output representative of the reflected light beam, in the second state of polarization, from the sample, the pinhole aperture member is positioned on an optical axis between the spectrometer and the analyzer member.

20. The film thickness measuring apparatus of claim 19 further including a plurality of pinhole apertures of diameter sizes ranging from 30 $\mu$m to 1 mm provided in a rotatable member to sequentially align a pinhole aperture on the optical axis and a motor for driving the rotatable member.

21. The film thickness measuring apparatus of claim 1 further including a beam limiting slit unit adjacent the source of light to reduce the beam diameter.

22. The film thickness measuring apparatus of claim 1 wherein the source of light is a lamp having a wavelength range that includes 190 nm to 830 nm.

23. The film thickness measuring apparatus of claim 22 wherein the incident optical system includes two concave reflective surfaces to reduce the incident beam diameter on the sample.

24. A film thickness measuring apparatus comprising:
a source of light;
an incident optical system for polarizing and directing light to a sample;
a detector optical system for receiving light from the sample, including a restricted aperture for defining a field of view on the sample; and
a sensor unit for providing an output representative of the light from the sample, wherein the detector optical system includes a plurality of restricted apertures of different sizes that are selectively inserted within an optical axis that extends through the detector optical system to provide respective different fields of view.

25. The film thickness measuring apparatus of claim 24, wherein the plurality of restricted apertures are provided in a rotatable member to sequentially align a restricted aperture on the optical axis.

26. The film thickness measuring apparatus of claim 25, further including a stepper motor for driving the rotatable member.

27. The film thickness measuring apparatus of claim 25, further including a fiber optic conduit operatively positioned between the rotatable member and the sensor unit.

28. The film thickness measuring apparatus of claim 24, wherein the detector optical system further includes a phase modulation member and an analyzer member.

29. The film thickness measuring apparatus of claim 28, wherein the detector optical system further includes a pair of concave reflective surfaces for focusing the light from the sample on the restricted aperture.

30. The film thickness measuring apparatus of claim 24, wherein the incident optical system further includes a pair of concave reflective surfaces for focusing the light from the light source on the sample.

31. The film thickness measuring apparatus of claim 30, wherein the incident optical system further includes a polarizer unit and a slit aperture member.

32. The film thickness measuring apparatus of claim 24, wherein the sensor unit is a spectrometer.

33. The film thickness measuring apparatus of claim 24, further including a microscope and a camera unit for providing an image of the sample.

34. The film thickness measuring apparatus of claim 33, further including a computer unit for processing the output of the sensor unit to measure optical constants of the surface and processing an output of the camera unit for providing an image for display with the optical constants.

* * * * *